US012759349B2

(12) United States Patent
Oh

(10) Patent No.: US 12,759,349 B2
(45) Date of Patent: Oct. 13, 2026

(54) VEHICLE CONTROL APPARATUS FOR MONITORING TIRE PRESSURE

(71) Applicants: Hyundai Motor Company, Seoul (KR); Kia Corporation, Seoul (KR)

(72) Inventor: Jung Hoon Oh, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 181 days.

(21) Appl. No.: 18/646,946

(22) Filed: Apr. 26, 2024

(65) Prior Publication Data

US 2025/0196550 A1 Jun. 19, 2025

(30) Foreign Application Priority Data

Dec. 13, 2023 (KR) ........................ 10-2023-0181224

(51) Int. Cl.
*B60C 23/04* (2006.01)

(52) U.S. Cl.
CPC ...... *B60C 23/0416* (2013.01); *B60C 23/0444* (2013.01)

(58) Field of Classification Search
CPC ....... B60C 23/008; B60C 23/02; B60C 23/04; B60C 23/0408; B60C 23/0416; B60C 23/0418; B60C 23/044; B60C 23/0437; B60C 23/0438; B60C 23/0444; B60C 23/0452; B60C 23/0464; B60C 23/0484; H01Q 1/2241; H01Q 1/3291
USPC ........................................................... 340/447
See application file for complete search history.

(56) References Cited

U.S. PATENT DOCUMENTS

2004/0113765 A1* 6/2004 Suitsu ................. B60C 23/0442 340/445
2006/0132296 A1* 6/2006 Robson ............... B60C 23/0408 340/445
2008/0127723 A1* 6/2008 Lin ..................... B60C 23/0433 73/146.4
2009/0153317 A1* 6/2009 Kim ................... G07C 9/00309 340/447
2009/0289783 A1* 11/2009 Kim .................... B60C 23/0416 340/447
2011/0304454 A1* 12/2011 Lickfelt .............. B60C 23/0444 340/447
2015/0077238 A1* 3/2015 Kitagawa ............ B60C 23/0415 340/447
2016/0258830 A1* 9/2016 Lammers ............... G01D 21/00
(Continued)

*Primary Examiner* — Stephen R Burgdorf
(74) *Attorney, Agent, or Firm* — Slater Matsil, LLP

(57) ABSTRACT

A vehicle control apparatus includes a plurality of tire pressure sensors respectively mounted on a plurality of wheels of a vehicle, a plurality of antennas each configured to transmit low frequency (LF) signals for triggering the plurality of tire pressure sensors to the tire pressure sensors present in an area where a transmit signal of the respective antenna reaches, a receiver configured to drive the antennas and receive radio frequency (RF) signals transmitted from the tire pressure sensors in response to receiving the LF signals, one or more processors, and a storage device storing a program to be executed by the one or more processors, the program including instructions to determine which wheel each tire pressure sensor is mounted on based on the RF signals received from the tire pressure sensors present in the area where the transmit signal of the respective antenna reaches.

19 Claims, 9 Drawing Sheets

(56) References Cited

U.S. PATENT DOCUMENTS

| | | | | |
|---|---|---|---|---|
| 2019/0176544 | A1* | 6/2019 | Ikeo | B60C 23/0433 |
| 2019/0256143 | A1* | 8/2019 | Lavoie | B60C 23/0479 |
| 2020/0114707 | A1* | 4/2020 | Li | B60C 23/045 |
| 2021/0021022 | A1* | 1/2021 | Hanaoka | H01Q 1/3291 |
| 2025/0033422 | A1* | 1/2025 | Strahan | H04Q 9/00 |

* cited by examiner

VEHICLE CONTROL APPARATUS FOR MONITORING TIRE PRESSURE

CROSS-REFERENCE TO RELATED APPLICATIONS

This application claims the benefit of Korean Patent Application No. 10-2023-0181224, filed on Dec. 13, 2023, which application is hereby incorporated herein by reference.

TECHNICAL FIELD

The present disclosure relates to a vehicle control apparatus and a method thereof.

BACKGROUND

Among the parts of a vehicle, only tires are in contact with the ground surface and serve to generate a driving force through their friction forces and absorb shock through elasticity. It is very important to manage the tires for safe driving.

The air pressure of the tires of the vehicle has a great influence on the performance and safety of the tires. The tires of the vehicle may be measured by tire air pressure sensors. Each of the tire air pressure sensors may be mounted for each wheel of the vehicle to measure pressure, a temperature, or the like of each of the tires to provide a driver of the vehicle with the measured information. The driver may manage the air pressure of each wheel by means of the information provided by the tire air pressure sensors.

An existing technology may determine which wheel of the vehicle the tire air pressure sensor is mounted on using wheel speed sensors. Wheel pulse information measured by the wheel speed sensor mounted for each wheel of the vehicle may be differently measured as the movement of each wheel varies. As such, the existing technology may determine which wheel the tire air pressure sensor is mounted on using the wheel pulse information differently measured for each wheel.

However, when the wheel speed sensor is used and when a problem occurs in controller area network (CAN) communication of the vehicle or the vehicle does not drive at a certain speed or more, it is difficult to determine which wheel the tire air pressure sensor is mounted on.

Meanwhile, recently, the vehicle is loaded with a function capable of determining a position of a smart key of the vehicle using a low frequency (LF) antenna mounted on the door of the driver's seat, the door of the passenger seat, a trunk, or the like or locking or unlocking a door of the vehicle using the smart key present within a certain distance from the vehicle.

SUMMARY

The present disclosure relates to a vehicle control apparatus and a method thereof. Particular embodiments relate to technologies for a tire pressure sensor.

Embodiments of the present disclosure can solve problems occurring in the prior art while advantages achieved by the prior art are maintained intact.

An embodiment of the present disclosure provides a vehicle control apparatus for reducing costs by using an LF antenna mounted on a vehicle, without a separate additional sensor, and a method thereof.

Another embodiment of the present disclosure provides a vehicle control apparatus for improving stability by using an LF antenna which is not influenced by an error in wheel pulse, an error in CAN communication, or the like and a method thereof.

Another embodiment of the present disclosure provides a vehicle control apparatus for receiving information about tire pressure even immediately after the vehicle is started by using an LF antenna capable of transmitting a signal even while the vehicle is not traveling and a method thereof.

The technical problems solvable by embodiments of the present disclosure are not limited to the aforementioned problems, and any other technical problems not mentioned herein will be clearly understood from the following description by those skilled in the art to which the present disclosure pertains.

According to an embodiment of the present disclosure, a vehicle control apparatus may include a plurality of tire pressure sensors mounted on a plurality of wheels of a vehicle, a plurality of antennas that transmits a low frequency (LF) signal for triggering each of the plurality of tire pressure sensors, a receiver that drives the plurality of LF antennas and receives a radio frequency (RF) signal, a memory storing a program instruction, and a processor that executes the program instruction. Each LF antenna included in the plurality of LF antennas may transmit the LF signal to at least some of the plurality of tire pressure sensors present in an area where a transmit signal of each LF antenna is reached. Each of the plurality of tire pressure sensors may transmit the RF signal to the receiver, upon receiving the LF signal. The processor may determine which wheel of the plurality of wheels of the vehicle each of the plurality of tire pressure sensors is mounted on, based on the RF signal received from the at least some of the plurality of tire pressure sensors present in the area where the transmit signal of each LF antenna is reached.

In an embodiment, the plurality of LF antennas may include a first LF antenna, a second LF antenna, and a third LF antenna. The first LF antenna may transmit the LF signal to a plurality of tire pressure sensors present in a first area where a transmit signal of the first LF antenna is reached. The second LF antenna may transmit the LF signal to a plurality of tire pressure sensors present in a second area where a transmit signal of the second LF antenna is reached. The third LF antenna may transmit the LF signal to a plurality of tire pressure sensors present in a third area where a transmit signal of the third LF antenna is reached.

In an embodiment, the processor may set the first area such that only a tire pressure sensor of a left front wheel tire of the vehicle and a tire pressure sensor of a left rear wheel tire of the vehicle receive the transmit signal of the first LF antenna, may set the second area such that only a tire pressure sensor of a right front wheel tire of the vehicle and a tire pressure sensor of a right rear wheel tire of the vehicle receive the transmit signal of the second LF antenna, and may set the third area such that only the tire pressure sensor of the left rear wheel tire of the vehicle and the tire pressure sensor of the right rear wheel tire of the vehicle receive the transmit signal of the third LF antenna.

In an embodiment, the processor may determine the plurality of tire pressure sensors, which transmit the RF signal based on the transmit signal of the first LF antenna, as at least one of a tire pressure sensor mounted on a left front wheel of the vehicle or a tire pressure sensor mounted on a left rear wheel of the vehicle, or any combination thereof, may determine the plurality of tire pressure sensors, which transmit the RF signal based on the transmit signal of the second LF antenna, as at least one of a tire pressure sensor mounted on a right front wheel of the vehicle or a tire pressure sensor mounted on a right rear wheel of the vehicle, or any combination thereof, and may determine the plurality of tire pressure sensors, which transmit the RF signal based on the transmit signal of the third LF antenna, as at least one of the tire pressure sensor mounted on the left rear wheel of the vehicle or the tire pressure sensor mounted on the right rear wheel of the vehicle, or any combination thereof.

In an embodiment, the processor may determine the tire pressure sensor, which transmits the RF signal based on only the transmit signal of the first LF antenna, as a tire pressure sensor mounted on a left front wheel of the vehicle, may determine the tire pressure sensor, which transmits the RF signal based on only both the transmit signal of the first LF antenna and the transmit signal of the third LF antenna, as a tire pressure sensor mounted on a left rear wheel of the vehicle, may determine the tire pressure sensor, which transmits the RF signal based on only the transmit signal of the second LF antenna, as a tire pressure sensor mounted on a right front wheel of the vehicle, and may determine the tire pressure sensor, which transmits the RF signal based on only both the transmit signal of the second LF antenna and the transmit signal of the third LF antenna, as a tire pressure sensor mounted on a right rear wheel of the vehicle.

In an embodiment, each of the plurality of tire pressure sensors may transmit the RF signal, including a unique ID of each of the plurality of tire pressure sensors or a pressure value of a tire, the pressure value being measured by each of the plurality of tire pressure sensors, or any combination thereof, to the receiver.

In an embodiment, the plurality of LF antennas may be configured such that the transmit signal is reached in an area having an oval shape with a long axis and a short axis.

In an embodiment, the processor may determine whether there is another vehicle within a predetermined distance from the vehicle using at least one of a camera mounted on the outside of the vehicle, an ultrasonic sensor mounted on the outside of the vehicle, or any combination thereof.

In an embodiment, the processor may determine that an RF signal transmitted by a tire pressure sensor of another vehicle is included in received three or more different RF signals, when the three or more different RF signals are received in the receiver, based on the LF signal transmitted by any one of the plurality of LF antennas.

In an embodiment, the processor may drive the plurality of LF antennas by means of the receiver to retransmit the LF signal, after a predetermined time from a time point when the RF signal transmitted by the tire pressure sensor of the other vehicle is received, based on the RF signal transmitted by the tire pressure sensor of the other vehicle being included in the received different RF signals, and may determine that re-received two different RF signals are received from the tire pressure sensors of the vehicle, when the two different RF signals among the three or more different RF signals are re-received in the receiver, based on the retransmitted LF signal.

In an embodiment, the processor may drive the plurality of LF antennas by means of the receiver to retransmit the LF signal, based on it being determined that there is no longer the other vehicle within a predetermined distance from the vehicle, after it is determined that the RF signal transmitted by the tire pressure sensor of the other vehicle is received, and may determine re-received two different RF signals are received from the tire pressure sensors of the vehicle, when the two different RF signals among the three or more different RF signals are re-received in the receiver, based on the retransmitted LF signal.

In an embodiment, the processor may set an extent of at least one of the first area, the second area, or the third area, or any combination thereof, based on vehicle information including at least one of an overall length of the vehicle, an overall width of the vehicle, or an overall height of the vehicle, or any combination thereof.

According to an embodiment of the present disclosure, a vehicle control method may include transmitting, by each of a plurality of LF antennas, which transmits a low frequency (LF) signal for triggering each of a plurality of tire pressure sensors, the LF signal to at least some of a plurality of tire pressure sensors present in an area where a transmit signal of each of the plurality of LF antennas is reached, transmitting, by the at least some of the plurality of tire pressure sensors mounted on a plurality of wheels of a vehicle, a radio frequency (RF) signal to a receiver upon receiving the LF signal, receiving, by the receiver for driving the plurality of LF antennas and receiving the RF signal, the RF signal, and determining, by a processor, which wheel of the plurality of wheels each of the plurality of tire pressure sensors is mounted on, based on the RF signal received from the at least some of the plurality of tire pressure sensors present in the area where the transmit signal of the LF antenna is reached.

In the vehicle control method according to an embodiment, the transmitting of the LF signal to the at least some of the plurality of tire pressure sensors present in the area where the transmit signal of each of the plurality of LF antennas is reached by each of the plurality of LF antennas, which transmits the LF signal for triggering each of the plurality of tire pressure sensors may include transmitting, by a first LF antenna included in the plurality of LF antennas, the LF signal to a plurality of tire pressure sensors present in a first area where a transmit signal of the first LF antenna is reached, transmitting, by a second LF antenna included in the plurality of LF antennas, the LF signal to a plurality of tire pressure sensors present in a second area where a transmit signal of the second LF antenna is reached, and transmitting, by a third LF antenna included in the plurality of LF antennas, the LF signal to a plurality of tire pressure sensors present in a third area where a transmit signal of the third LF antenna is reached.

In the vehicle control method according to an embodiment, the determining of which wheel of the plurality of wheels each of the plurality of tire pressure sensors is mounted on, based on the RF signal received from the at least some of the plurality of tire pressure sensors present in the area where the transmit signal of the LF antenna is reached, by the processor may include determining, by the processor, the plurality of tire pressure sensors, which transmit the RF signal based on the transmit signal of the first LF antenna, as at least one of a tire pressure sensor mounted on a left front wheel of the vehicle or a tire pressure sensor mounted on the left rear wheel of the vehicle, or any combination thereof, determining, by the processor, the plurality of tire pressure sensors, which transmit the RF signal based on the transmit signal of the second LF antenna, as at least one of a tire pressure sensor mounted on a right front wheel of the vehicle or a tire pressure sensor mounted on a right rear wheel of the vehicle, or any combination thereof, and determining, by the processor, the plurality of tire pressure sensors, which transmit the RF signal based on the transmit signal of the third LF antenna, as at least one of the tire pressure sensor mounted on the left rear wheel of the vehicle or the tire pressure sensor mounted on the right rear wheel of the vehicle, or any combination thereof.

In the vehicle control method according to an embodiment, the transmitting of the RF signal to the receiver, upon receiving the LF signal, by the at least some of the plurality of tire pressure sensors may include transmitting, by each of the plurality of tire pressure sensors, the RF signal, including a unique ID of each of the plurality of tire pressure sensors or a pressure value of a tire, the pressure value being measured by each of the plurality of tire pressure sensors, or any combination thereof, to the receiver.

In the vehicle control method according to an embodiment, the determining of which wheel of the plurality of wheels each of the plurality of tire pressure sensors is mounted on, based on the RF signal received from the at least some of the plurality of tire pressure sensors present in the area where the transmit signal of the LF antenna is reached, by the processor may include determining, by the processor, whether there is another vehicle within a predetermined distance from the vehicle, using at least one of a camera mounted on the outside of the vehicle or an ultrasonic sensor mounted on the outside of the vehicle, or any combination thereof.

In the vehicle control method according to an embodiment, the determining of which wheel of the plurality of wheels each of the plurality of tire pressure sensors is mounted on, based on the RF signal received from the at least some of the plurality of tire pressure sensors present in the area where the transmit signal of the LF antenna is reached, by the processor may include determining, by the processor, that an RF signal transmitted by a tire pressure sensor of another vehicle is included in received three or more different RF signals, when the three or more different RF signals are received in the receiver, based on the LF signal transmitted by any one of the plurality of LF antennas.

In the vehicle control method according to an embodiment, the determining of which wheel of the plurality of wheels each of the plurality of tire pressure sensors is mounted on, based on the RF signal received from the at least some of the plurality of tire pressure sensors present in the area where the transmit signal of the LF antenna is reached, by the processor may include driving, by the processor, the plurality of LF antennas by means of the receiver to retransmit the LF signal, after a predetermined time from a time point when the RF signal transmitted by the tire pressure sensor of the other vehicle is received, based on that the RF signal transmitted by the tire pressure sensor of the other vehicle is included in the received different RF signals, and determining, by the processor, that re-received two different RF signals are received from the tire pressure sensors of the vehicle, when the two different RF signals among the three or more different RF signals are re-received in the receiver, based on the retransmitted LF signal.

In the vehicle control method according to an embodiment, the determining of which wheel of the plurality of wheels each of the plurality of tire pressure sensors is mounted on, based on the RF signal received from the at least some of the plurality of tire pressure sensors present in the area where the transmit signal of the LF antenna is reached, by the processor may include driving, by the processor, the plurality of LF antennas to retransmit the LF signal, based on it being determined that there is no longer the other vehicle within a predetermined distance from the vehicle, after it is determined that the RF signal transmitted by the tire pressure sensor of the other vehicle is received, and determining, by the processor, that re-received two different RF signals are received from the tire pressure sensors of the vehicle, when the two different RF signals among the three or more different RF signals are re-received in the receiver, based on the retransmitted LF signal.

BRIEF DESCRIPTION OF THE DRAWINGS

The above and other objects, features, and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
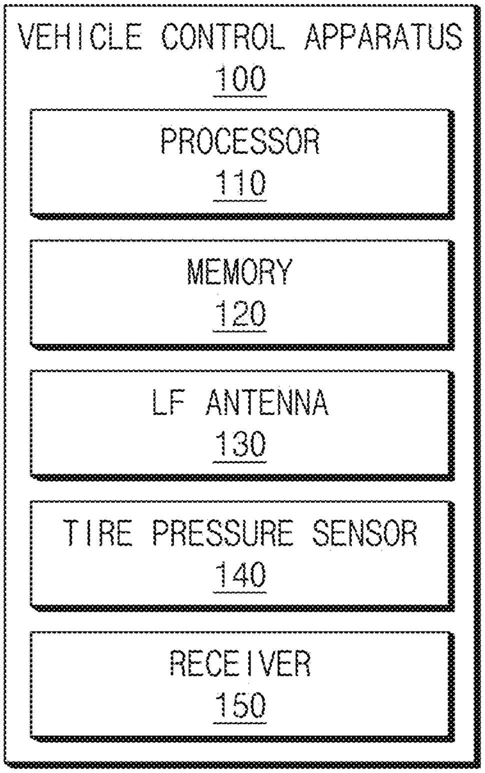
FIG. 1 is a block diagram illustrating a vehicle control apparatus according to an embodiment of the present disclosure.

Hereinafter, some embodiments of the present disclosure will be described in detail with reference to the exemplary drawings. In adding the reference numerals to the components of each drawing, it should be noted that the identical component is designated by the identical numeral even when it is displayed on other drawings. In addition, a detailed description of well-known features or functions will be omitted in order not to unnecessarily obscure the gist of the present disclosure.

In describing components of exemplary embodiments of the present disclosure, the terms first, second, A, B, (a), (b), and the like may be used herein. These terms are only used to distinguish one component from another component, but they do not limit the corresponding components irrespective of the order or priority of the corresponding components. Particularly, the expression "at least one of A, B, or C, or any combination thereof" may include "A", "B", or "C", or "AB", "BC", "AC", or "ABC", which is a combination thereof.

Furthermore, unless otherwise defined, all terms including technical and scientific terms used herein have the same meaning as being generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 9.

FIG. 1 is a block diagram illustrating a vehicle control apparatus according to an embodiment of the present disclosure.

According to an embodiment, a vehicle control apparatus 100 may include a processor 110, a memory 120, a low frequency (LF) antenna 130, a tire pressure sensor 140, and a receiver 150. The components of the vehicle control apparatus 100, which are shown in FIG. 1, are illustrative, and embodiments of the present disclosure are not limited thereto. For example, the vehicle control apparatus 100 may further include components which are not shown in FIG. 1.

According to an embodiment, the memory 120 may store a command or data. For example, the memory 120 may store one instruction or two or more instructions that, when executed by the processor 110, cause the vehicle control apparatus 100 to perform various operations.

According to an embodiment, the memory 120 and the processor 110 may be implemented as one chipset and may store various pieces of information associated with the vehicle control apparatus 100. For example, the memory 120 may store information about an operation history of the processor 110.

According to an embodiment, the memory 120 may include a non-volatile memory (e.g., a read only memory (ROM)) and a volatile memory (e.g., a random access memory (RAM)). For example, the pressure of a tire or the like, which is measured by the tire pressure sensor 140, may be stored in the memory 120.

According to an embodiment, the plurality of tire pressure sensors 140 may be mounted on a plurality of wheels of a vehicle. For example, the tire pressure sensor 140 may be mounted for each wheel of the vehicle. As a detailed example, when the number of wheels of the vehicle is four, each of a total of four tire pressure sensors 140 may be mounted for each wheel.

According to an embodiment, the plurality of LF antennas 130 may transmit an LF signal for triggering each of the plurality of tire pressure sensors 140.

According to an embodiment, the triggering may include an operation of being automatically performed when a database meets a predetermined condition or when a certain operation is performed.

For example, the tire pressure sensor 140 may be configured to be triggered when receiving the LF signal from the LF antenna 130. As a detailed example, upon receiving the LF signal in a state in which low power is used, the tire pressure sensor 140 may switch to a state in which rated power is used. As another detailed example, upon receiving the LF signal in a state in which any signal is not transmitted, the tire pressure sensor 140 may transmit a radio frequency (RF) signal. This is only an embodiment. In addition, the triggering may be set to connect various conditions with various operations.

According to an embodiment, the LF antennas 130 may trigger the plurality of tire pressure sensors 140 which receive the LF signal. For example, the tire pressure sensor 140 may be triggered whenever receiving the LF signal. As a detailed example, when the tire pressure sensor 140 is configured to transmit the RF signal whenever receiving the LF signal, it may transmit the RF signal several times upon receiving the plurality of LF signals.

According to an embodiment, the receiver 150 may drive the plurality of LF antennas 130 to receive the RF signal. For example, the receiver 150 may include an independent processor capable of driving the LF antenna 130.

For example, when power is applied to the vehicle, the receiver 150 may cause the LF antenna 130 to transmit the LF signal. The LF antenna 130 may be driven by the receiver 150.

According to an embodiment, the receiver 150 may receive the RF signal. For example, the receiver 150 may receive the RF signal transmitted by the tire pressure sensor 140 and may deliver the RF signal to the processor 110.

According to an embodiment, each LF antenna 130 included in the plurality of LF antennas 130 may transmit the LF signal to at least some of the plurality of tire pressure sensors 140 present in an area where a transmit signal of each LF antenna 130 is reached.

According to an embodiment, the area where the transmit signal of the LF antenna 130 is able to be reached may be set by a system or a user. For example, the area where the transmit signal of the LF antenna 130 is able to be reached may be set by software and may be physically set by a coil or the like constituting the LF antenna 130. As a detailed example, the area where the transmit signal of the LF antenna 130 is able to be reached may be set to an oval-shaped area with a long axis and a short axis depending on a physical shape of the LF antenna 130 or a setting of software.

According to an embodiment, the processor 110 may set the area where the LF signal transmitted by the LF antenna 130 is able to be reached. Thus, the processor 110 may set the area where the LF signal of the LF antenna 130 is able to be reached, such that the LF signal is able to be reached in only a specific wheel of the vehicle.

As a detailed example, the processor 110 may set the area where the transmit signal of the LF antenna 130 is able to be reached such that only a front wheel located at the left of the vehicle and a rear wheel located at the left of the vehicle are able to receive the LF signal. As another detailed example, the processor 110 may set the area where the transmit signal of the LF antenna 130 is able to be reached such that only a front wheel located at the right of the vehicle and a rear wheel located at the right of the vehicle are able to receive the LF signal. As another detailed example, the processor 110 may set the area where the transmit signal of the LF antenna 130 is able to be reached such that only the rear wheel located at the left of the vehicle and the rear wheel located at the right of the vehicle are able to receive the LF signal.

According to an embodiment, at least some of the plurality of tire pressure sensors 140 may receive the LF signal transmitted by the LF antenna 130. For example, the tire pressure sensor 140 which receives the LF signal transmitted by the specific LF antenna 130 may be one in number and may be plural in number.

According to an embodiment, upon receiving the LF signal, each of the plurality of tire pressure sensors 140 may transmit the RF signal to the receiver 150.

For example, the tire pressure sensor 140 may include a communication interface capable of receiving the LF signal. Thus, there may be no need for a separate sensor for receiving the LF signal.

For example, the tire pressure sensor 140 may transmit the RF signal to the receiver 150 whenever receiving the LF signal. Thus, even when the tire pressure sensor 140 which already transmits the RF signal to the receiver 150 upon receiving the LF signal transmitted by the specific LF antenna 130 receives the LF signal transmitted by the other LF antenna 130, it may retransmit the RF signal to the receiver 150.

According to an embodiment, each of the plurality of tire pressure sensors 140 may transmit the RF signal, including a unique ID of each of the plurality of tire pressure sensors 140 or a pressure value of the tire, which is measured by each of the plurality of tire pressure sensors 140, or any combination thereof, to the receiver 150.

For example, the tire pressure sensor 140 may have a unique ID value. The tire pressure sensor 140 may transmit the RF signal including information about the unique ID to the receiver 150. The receiver 150 may distinguish the tire pressure sensor 140 in light of the unique ID.

For example, the tire pressure sensor 140 may measure the pressure of the tire. The tire pressure sensor 140 may transmit the RF signal, including the pressure value of the tire, to the receiver 150.

According to an embodiment, the processor 110 may determine which wheel of the plurality of wheels of the vehicle each of the plurality of tire pressure sensors 140 is mounted on, based on the RF signal received from the at least some of the plurality of tire pressure sensors 140 present in the area where the transmit signal of each LF antenna 130 is reached.

According to an embodiment, the plurality of LF antennas 130 may include a first LF antenna, a second LF antenna, and a third LF antenna. For example, the first LF antenna may be located on a door of the driver's seat of the vehicle, the second LF antenna may be located on a door of the passenger seat of the vehicle, and the third LF antenna may be located on a trunk of the vehicle.

According to an embodiment, the processor 110 may set the area where the transmit signal of each of the LF antennas 130 is able to be reached. For example, the processor 110 may set a first area where the transmit signal of the first LF antenna is able to be reached, may set a second area where the transmit signal of the second LF antenna is able to be reached, and may set a third area where the transmit signal of the third LF antenna is able to be reached.

According to an embodiment, the processor 110 may set an extent of at least one of the first area, the second area, or the third area, or any combination thereof, based on vehicle information including an overall length of the vehicle, an overall width of the vehicle, or an overall height of the vehicle, or any combination thereof.

For example, the overall length of the vehicle may indicate the entire length of the vehicle and may include a length from a front part of the vehicle to a rear part of the vehicle. The overall width of the vehicle may indicate the entire width of the vehicle and may include a width from the left of the vehicle to the right of the vehicle. The overall height of the vehicle may indicate the entire height of the vehicle and may include a height from the top point of the vehicle to the bottom of the vehicle.

For example, the processor 110 may set the first area where the transmit signal of the first LF antenna is able to be reached to include a tire pressure sensor of a left front wheel tire and a tire pressure sensor of a left rear wheel tire. At this time, when the overall length of the vehicle is relatively long and the overall width of the vehicle is relatively narrow, the processor 110 may set the first area to be an oval in which a width in the direction of the overall length is relatively longer than a width in the direction of the overall width with respect to the first LF antenna.

According to an embodiment, the processor 110 may set the area where the transmit signal of each of the LF antennas 130 is able to be reached, such that only two tire pressure sensors 140 are included in the area where the transmit signal of each of the LF antennas 130 is able to be reached. Only the tire pressure sensor 140 present in the area where the transmit signal is able to be reached may receive the LF signal of the LF antenna 130.

According to an embodiment, the first LF antenna may transmit the LF signal to the plurality of tire pressure sensors present in the first area where the transmit signal of the first LF antenna is reached.

For example, the processor 110 may set the first area such that only the tire pressure sensor of the left front wheel tire of the vehicle and the tire pressure sensor of the left rear wheel tire of the vehicle receive the transmit signal of the first LF antenna. In this case, upon receiving the LF signal, only the tire pressure sensor of the left front wheel tire and the tire pressure sensor of the left rear wheel tire may transmit the RF signal, including a unique ID of each of the tire pressure sensors, to the receiver 150.

According to an embodiment, the second LF antenna may transmit the LF signal to the plurality of tire pressure sensors present in the second area where the transmit signal of the second LF antenna is reached.

For example, the processor 110 may set the second area such that only the tire pressure sensor of the right front wheel tire of the vehicle and the tire pressure sensor of the right rear wheel tire of the vehicle receive the transmit signal of the second LF antenna. In this case, upon receiving the LF signal, only the tire pressure sensor of the right front wheel tire and the tire pressure sensor of the right rear wheel tire may transmit the RF signal, including a unique ID of each of the tire pressure sensors, to the receiver 150.

According to an embodiment, the third LF antenna may transmit the LF signal to the plurality of tire pressure sensors present in the third area where the transmit signal of the third LF antenna is reached.

For example, the processor 110 may set the third area such that only the tire pressure sensor of the left rear wheel tire of the vehicle and the tire pressure sensor of the right rear wheel tire of the vehicle receive the transmit signal of the third LF antenna. In this case, upon receiving the LF signal, only the tire pressure sensor of the left rear wheel tire and the tire pressure sensor of the right rear wheel tire may transmit the RF signal, including a unique ID of each of the tire pressure sensors, to the receiver 150.

According to an embodiment, the processor 110 may determine the plurality of tire pressure sensors, which transmit the RF signal based on the transmit signal of the first LF antenna, as at least one of the tire pressure sensor mounted on the left front wheel of the vehicle or the tire pressure sensor mounted on the left rear wheel of the vehicle, or any combination thereof.

For example, there may be the left front wheel of the vehicle and the left rear wheel of the vehicle in the first area where the transmit signal of the first LF antenna located on the door of the driver's seat is reached. In this case, the tire pressure sensor mounted on the left front wheel and the tire pressure sensor mounted on the left rear wheel may transmit the RF signal including information about the unique ID of each of the tire pressure sensors.

According to an embodiment, the processor 110 may determine the plurality of tire pressure sensors, which transmit the RF signal based on the transmit signal of the second LF antenna, as at least one of the tire pressure sensor mounted on the right front wheel of the vehicle or the tire pressure sensor mounted on the right rear wheel of the vehicle, or any combination thereof.

For example, there may be the right front wheel of the vehicle and the right rear wheel of the vehicle in the second area where the transmit signal of the second LF antenna located on the door of the passenger seat is reached. In this case, the tire pressure sensor mounted on the right front wheel and the tire pressure sensor mounted on the right rear wheel may transmit the RF signal including information about the unique ID of each of the tire pressure sensors.

According to an embodiment, the processor 110 may determine the plurality of tire pressure sensors, which transmit the RF signal based on the transmit signal of the third LF antenna, as at least one of the tire pressure sensor mounted on the left rear wheel of the vehicle or the tire pressure sensor mounted on the right rear wheel of the vehicle, or any combination thereof.

For example, there may be the left rear wheel of the vehicle and the right rear wheel of the vehicle in the third area where the transmit signal of the third LF antenna located on the trunk is reached. In this case, the tire pressure sensor mounted on the left rear wheel and the tire pressure sensor mounted on the right rear wheel may transmit the RF signal including information about the unique ID of each of the tire pressure sensors.

According to an embodiment, the processor 110 may sequentially drive the first LF antenna, the second LF antenna, and the third LF antenna by means of the receiver 150 and may determine a wheel on which the tire pressure sensor 140 is mounted.

For example, the processor 110 may sequentially trigger the tire pressure sensor mounted on the left front wheel and the tire pressure sensor mounted on the left rear wheel by means of the LF signal of the first LF antenna located on the door of the driver's seat, may sequentially trigger the tire pressure sensor mounted on the right front wheel and the tire pressure sensor mounted on the right rear wheel by means of the LF signal of the second LF antenna located on the door of the passenger seat, and may sequentially trigger the tire pressure sensor mounted on the left rear wheel and the tire pressure sensor mounted on the right rear wheel by means of the LF signal of the third LF antenna located on the trunk.

As a detailed example, the processor 110 may determine the tire pressure sensor 140, which transmits the RF signal based on only the transmit signal of the first LF antenna, as the tire pressure sensor mounted on the left front wheel of the vehicle.

As a detailed example, the processor 110 may determine the tire pressure sensor 140, which transmits the RF signal based on only both the transmit signal of the first LF antenna and the transmit signal of the third LF antenna, as the tire pressure sensor mounted on the left rear wheel of the vehicle.

As a detailed example, the processor 110 may determine the tire pressure sensor 140, which transmits the RF signal based on only the transmit signal of the second LF antenna, as the tire pressure sensor mounted on the right front wheel of the vehicle.

As a detailed example, the processor 110 may determine the tire pressure sensor 140, which transmits the RF signal based on only both the transmit signal of the second LF antenna and the transmit signal of the third LF antenna, as the tire pressure sensor mounted on the right rear wheel of the vehicle.

According to an embodiment, there may be another vehicle around a host vehicle loaded with the vehicle control apparatus 100. When there is another vehicle at a distance adjacent to the host vehicle, a tire pressure sensor of the other vehicle may be triggered by the LF signal transmitted by the LF antenna 130 of the host vehicle. In this case, the receiver 150 of the host vehicle may receive an RF signal transmitted by the tire pressure sensor of the other vehicle. Thus, there is a need to determine whether there is another vehicle around the host vehicle.

According to an embodiment, the processor 110 may determine whether there is another vehicle within a predetermined distance from the vehicle, using at least one of a camera mounted on the outside of the vehicle or an ultrasonic sensor mounted on the outside of the vehicle, or any combination thereof.

For example, the camera mounted on the outside of the vehicle may include cameras, such as a built-in camera, a front view camera, a rear view camera, a mono camera, and a stereo camera provided in the vehicle, which are capable of capturing or detecting the periphery of the vehicle.

For example, the ultrasonic sensor mounted on the outside of the vehicle may include a distance sensor for sensing a distance between the vehicle and a surrounding object. The ultrasonic sensor may include a sensor capable of sensing that a surrounding object approaches the vehicle. As a detailed example, the ultrasonic sensor may include a parking assistance system (PAS) sensor.

For example, the predetermined distance from the vehicle may be set in light of the area where the transmit signal of the LF antenna 130 is able to be reached. As a detailed example, the predetermined distance from the vehicle may be set to a distance at which the tire pressure sensor of the other vehicle is able to receive the transmit signal of the LF antenna 130 of the host vehicle.

According to an embodiment, when three or more different RF signals are received in the receiver 150, based on the LF signal transmitted by any one of the plurality of LF antennas 130, the processor 110 may determine that the RF signal transmitted by the tire pressure sensor of the other vehicle is included in the received different RF signals.

For example, when it is identified that unique IDs included in the three or more RF signals received through the receiver 150 are different from each other, the processor 110 may determine that the three or more different RF signals are received.

For example, when the three different RF signals are received in the receiver 150, for the LF signal transmitted by the first LF antenna located on the door of the driver's seat of the host vehicle, the processor 110 may determine that another RF signal, which does not correspond to the tire pressure sensor 140 mounted on the left front wheel of the host vehicle and the tire pressure sensor 140 mounted on the left rear wheel of the host vehicle, is included. In this case, unless there is a special circumstance, the processor 110 may determine that the RF signal transmitted by the tire pressure sensor of the other vehicle is received in the receiver 150.

For example, although determining that the RF signal transmitted by the tire pressure sensor of the other vehicle is included in the three or more different RF signals received through the receiver 150, the processor 110 may fail to distinguish whether any of the three or more different RF signals corresponds to the RF signal received from the tire pressure sensor 140 of the host vehicle. Thus, there is an additional need to determine the RF signal received from the tire pressure sensor 140 of the host vehicle among the three or more different RF signals.

According to an embodiment, the processor 110 may drive the plurality of LF antennas 130 by means of the receiver 150 to retransmit the LF signal, after a predetermined time from a time point when the RF signal transmitted by the tire pressure sensor of the other vehicle is received, based on the RF signal transmitted by the tire pressure sensor of the other vehicle being included in the received different RF signals.

For example, the predetermined time may be set to a sufficient time when another vehicle is unable to be present within a distance adjacent to the host vehicle. As a detailed example, while the host vehicle and the other vehicle are traveling, the predetermined time may be set in light of a speed of the host vehicle and a speed of the other vehicle. As another detailed example, while the host vehicle and the other vehicle are parking or while the host vehicle and the other vehicle are stopping, the predetermined time may be set to a time when the host vehicle or the other vehicle starts and are unable to be adjacent to each other.

According to an embodiment, when driving the plurality of LF antennas 130 by means of the receiver 150 to retransmit the LF signal, the processor 110 may drive all the plurality of LF antennas 130 loaded into the vehicle and may drive only the LF antenna 130 triggered to transmit three or more different RF signals.

According to an embodiment, when two different RF signals among the three or more different RF signals are re-received in the receiver 150, based on the retransmitted LF signal, the processor 110 may determine that the re-received two different RF signals are received from the tire pressure sensor 140 of the host vehicle.

For example, when the two different RF signals are re-received in the receiver 150 based on the retransmitted LF signal, there may be no other vehicle around the host vehicle. Thus, the processor 110 may determine that the re-received two different RF signals are received from the tire pressure sensor 140 of the host vehicle.

As a detailed example, when the unique ID included in the re-received two different RF signals is identical to the unique ID included in the three or more different RF signals which are previously received, the processor 110 may determine that the re-received two different RF signals are received from the tire pressure sensor 140 of the host vehicle.

According to an embodiment, the processor 110 may drive the plurality of antennas 130 by means of the receiver 150 to retransmit the LF signal, based on it being determined that the other vehicle is no longer within the predetermined distance from the host vehicle, after it is determined that the RF signal transmitted by the tire pressure sensor of the other vehicle is received.

For example, the processor 110 may determine whether there is another vehicle within the predetermined distance from the host vehicle, using the camera mounted on the outside of the host vehicle, the ultrasonic sensor mounted on the outside of the host vehicle, or the like. In detail, the processor 110 may continuously identify another vehicle present within the predetermined distance by means of the camera, the ultrasonic sensor, or the like.

For example, when it is determined that there is no longer the other vehicle within the predetermined distance from the host vehicle, the processor 110 may drive the LF antennas 130 again by means of the receiver 150 to receive only the RF signal transmitted by the tire pressure sensor 140 of the host vehicle. At this time, the processor 110 may drive all the plurality of LF antennas 130 loaded into the host vehicle and may drive only the LF antenna 130 triggered to transmit three or more RF signals. The driven LF antenna 130 may retransmit the LF signal.

According to an embodiment, when two different RF signals among the three or more different RF signals are re-received in the receiver 150, based on the retransmitted LF signal, the processor 110 may determine that the re-received two different RF signals are received from the tire pressure sensor 140 of the host vehicle.

For example, when the unique ID included in the re-received two different RF signals is identical to the unique ID included in the three or more different RF signals which are previously received, the processor 110 may determine that the re-received two different RF signals are received from the tire pressure sensor 140 of the host vehicle.

Figure 2:
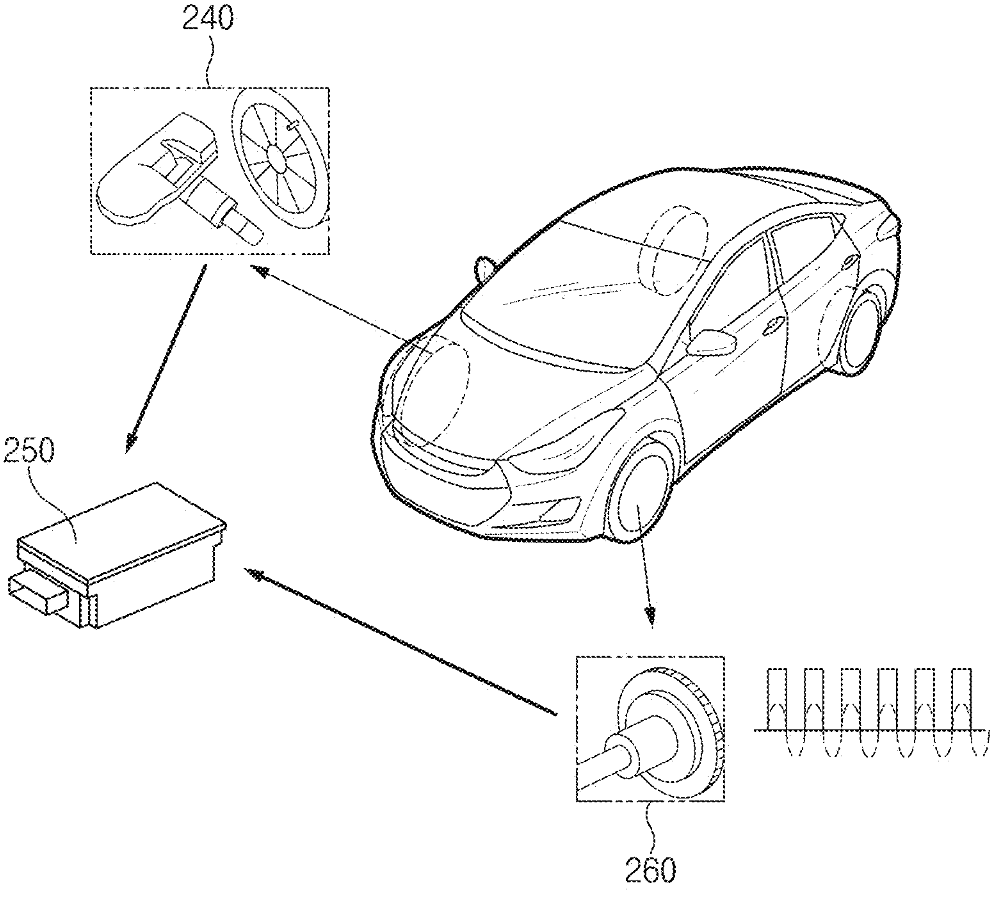
FIG. 2 is a drawing illustrating an example of determining a position of a tire air pressure sensor using an existing wheel speed sensor, in a vehicle control apparatus according to an embodiment of the present disclosure.

FIG. 2 is a drawing illustrating an example of determining a position of a tire air pressure sensor using an existing wheel speed sensor, in a vehicle control apparatus according to an embodiment of the present disclosure.

According to an embodiment, a position of a tire pressure sensor 240 might be conventionally determined using a wheel speed sensor 260. For example, a receiver 250 may receive information about a wheel pulse from the wheel speed sensor 260.

According to an embodiment, the wheel speed sensor 260 may be mounted for each wheel of the vehicle. Wheel pulse information may be differently measured according to the movement of each wheel. For example, when the vehicle turns left or right, a rotational speed of a wheel at the left of the vehicle and a rotational speed of a wheel at the right of the vehicle may be different from each other. Thus, the wheel pulse information may be differently measured.

As such, the receiver 250 may determine which wheel the wheel speed sensor 260 is mounted on, using the wheel pulse information differently measured for each wheel.

According to an embodiment, the tire pressure sensor 240 may measure at least one of pressure of a tire or a temperature of the tire, or any combination thereof, and may transmit the measured information as an RF signal to the receiver 250. The receiver 250 may determine a position of the tire pressure sensor 240 interworking with the wheel speed sensor 260, using the wheel pulse information.

However, because the wheel speed sensor 260 transmits information using CAN communication, when an error occurs in the CAN communication or when the wheel speed sensor 260 fails, it is difficult for a processor to determine a position of the tire pressure sensor 240.

Furthermore, because the wheel speed sensor 260 is able to operate as the vehicle travels, it is difficult for a processor to determine a position of the tire pressure sensor 240 while stopping.

Figure 3:
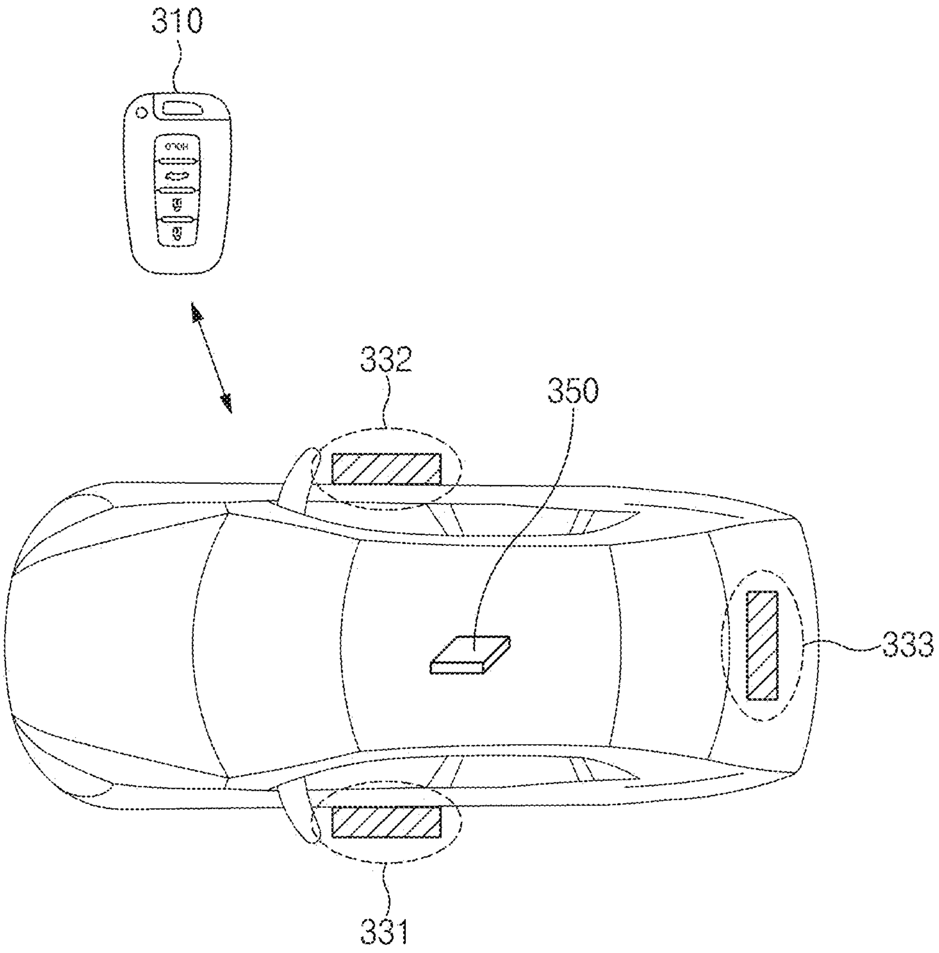
FIG. 3 is a drawing illustrating an example of a smart key system using an LF antenna loaded into a vehicle, in a vehicle control apparatus according to an embodiment of the present disclosure.

FIG. 3 is a drawing illustrating an example of a smart key system using an LF antenna loaded into a vehicle, in a vehicle control apparatus according to an embodiment of the present disclosure.

According to an embodiment, the smart key system may allow a user who has a smart key 310 to perform a door or trunk opening and closing function of the vehicle, using an LF signal or an RF signal. In addition, the smart key system may perform various functions of starting an engine using the smart key 310 or providing a service interworking with a smartphone.

For example, LF antennas may be loaded into a door of the driver's seat of the vehicle, a door of the passenger seat of the vehicle, and a trunk of the vehicle. In detail, a first LF antenna 331 may be loaded into the door of the driver's seat, a second LF antenna 332 may be loaded into the door of the passenger seat, and a third LF antenna 333 may be loaded into the trunk.

According to an embodiment, a receiver 350 may drive the first LF antenna 331, the second LF antenna 332, or the third LF antenna 333. The driven LF antenna may transmit an LF signal.

Upon receiving the LF signal transmitted by the LF antenna, the smart key 310 may transmit an RF signal. At this time, information about a function of operating a door of the vehicle or starting the vehicle may be included in the RF signal.

The receiver 350 may receive the RF signal transmitted by the smart key 310. The receiver 350 may control the vehicle to perform an operation associated with the function included in the RF signal. Alternatively, the receiver 350 may transmit related data to a separate processor capable of performing an operation associated with the function.

According to an embodiment according to FIG. 2, in a method for determining a position of a tire pressure sensor using an existing wheel speed sensor, it is difficult for a processor to determine the position of the tire pressure sensor due to an error in CAN communication, a failure in a wheel speed sensor, or the stop of the vehicle.

Meanwhile, according to an embodiment, according to FIG. 3, an LF antenna is basically mounted on the vehicle for the smart key system.

Thus, when the LF antenna and the tire pressure sensor interwork with each other to determine which wheel the tire pressure sensor is mounted on, problems which occur by using the existing wheel speed sensor may be overcome.

Figure 4:
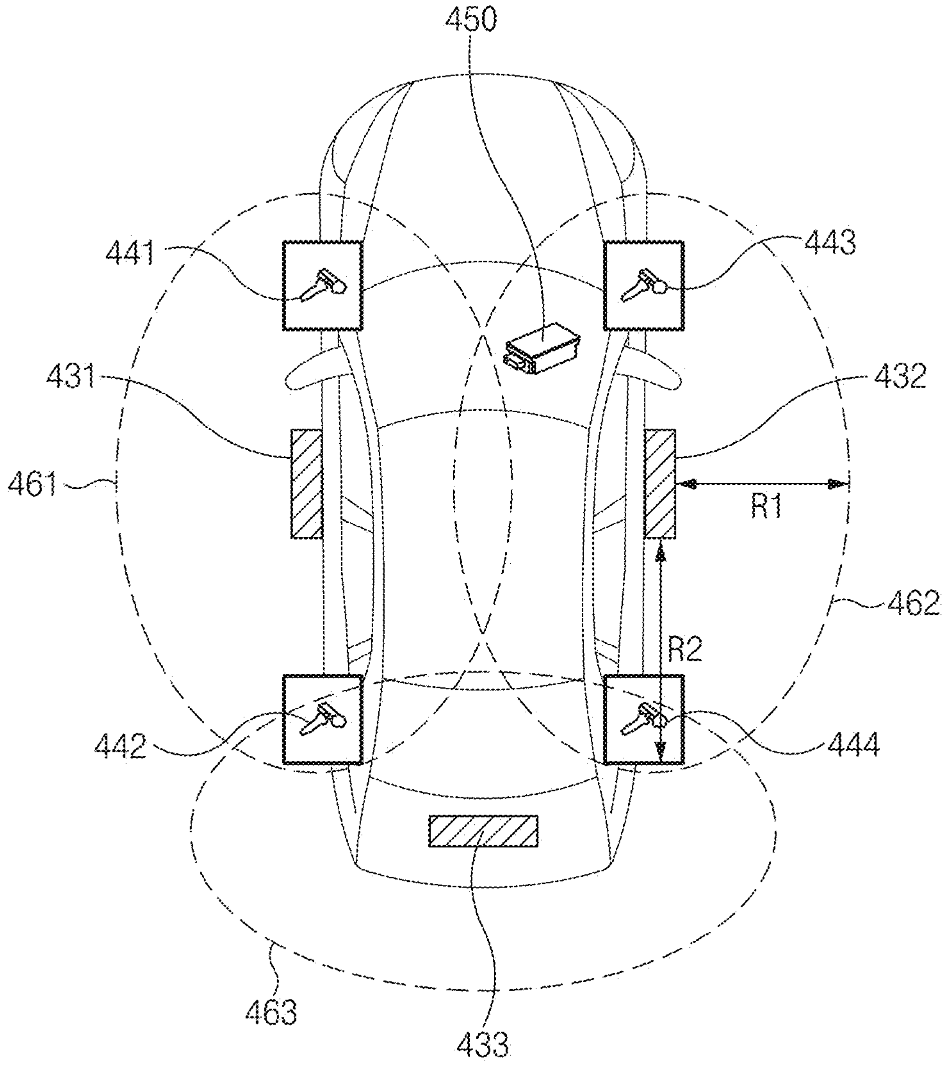
FIG. 4 is a drawing illustrating an example of tire pressure sensors present in an area where a transmit signal of each of LF antennas is reached, in a vehicle control apparatus according to an embodiment of the present disclosure.

FIG. 4 is a drawing illustrating an example of tire pressure sensors present in an area where a transmit signal of each of the LF antennas is reached, in a vehicle control apparatus according to an embodiment of the present disclosure.

According to an embodiment, in the vehicle control apparatus, each of a total of four tire pressure sensors may be mounted for each wheel of a vehicle, and a total of three LF antennas may be mounted on a door of the driver's seat of the vehicle, a door of the passenger seat of the vehicle, and a trunk of the vehicle.

According to an embodiment, a first LF antenna 431 may be mounted on the door of the driver's seat. The first LF antenna 431 may transmit an LF signal to a plurality of tire pressure sensors present in a first area 461 where a transmit signal of the first LF antenna 431 is reached.

According to an embodiment, a second LF antenna 432 may be mounted on the door of the passenger seat. The second LF antenna 432 may transmit an LF signal to a plurality of tire pressure sensors present in a second area 462 where a transmit signal of the second LF antenna 432 is reached.

According to an embodiment, a third LF antenna 433 may be mounted on the trunk. The third LF antenna 433 may transmit an LF signal to a plurality of tire pressure sensors present in a third area 463 where a transmit signal of the third LF antenna 433 is reached.

According to an embodiment, the first area 461, the second area 462, or the third area 463 may be set to an oval-shaped area which has a short-axis radius R1 and a long-axis radius R2 around each LF antenna.

According to an embodiment, the vehicle control apparatus may set an area where the transmit signal of each LF antenna is reached. For example, the vehicle control apparatus may set an extent of one of the first area 461, the second area 462, or the third area 463, based on vehicle information including an overall length of the vehicle, an overall width of the vehicle, or an overall height of the vehicle, or any combination thereof.

According to an embodiment, a receiver 450 may drive the first LF antenna 431. The first LF antenna 431 may transmit an LF signal capable of triggering a tire pressure sensor present in the first area 461. A left front wheel tire pressure sensor 441 and a left rear wheel tire pressure sensor 442, which are present in the first area 461, may receive the LF signal transmitted by the first LF antenna 431. The left front wheel tire pressure sensor 441 and the left rear wheel tire pressure sensor 442 may transmit an RF signal including a unique ID of each of the left front wheel tire pressure sensor 441 and the left rear wheel tire pressure sensor 442. The receiver 450 may receive RF signals transmitted by the left front wheel tire pressure sensor 441 and the left rear wheel tire pressure sensor 442.

According to an embodiment, the receiver 450 may drive the second LF antenna 432. The second LF antenna 432 may transmit an LF signal capable of triggering a tire pressure sensor present in the second area 462. A right front wheel tire pressure sensor 443 and a right rear wheel tire pressure sensor 444, which are present in the second area 462, may receive the LF signal transmitted by the second LF antenna 432. The right front wheel tire pressure sensor 443 and the right rear wheel tire pressure sensor 444 may transmit an RF signal including a unique ID of each of the right front wheel tire pressure sensor 443 and the right rear wheel tire pressure sensor 444. The receiver 450 may receive RF signals transmitted by the right front wheel tire pressure sensor 443 and the right rear wheel tire pressure sensor 444.

According to an embodiment, the receiver 450 may drive the third LF antenna 433. The third LF antenna 433 may transmit an LF signal capable of triggering a tire pressure sensor present in the third area 463. The left rear wheel tire pressure sensor 442 and the right rear wheel tire pressure sensor 444, which are present in the third area 463, may receive the LF signal transmitted by the third LF antenna 433. The left rear wheel tire pressure sensor 442 and the right rear wheel tire pressure sensor 444 may transmit an RF signal including a unique ID of each of the left rear wheel tire pressure sensor 442 and the right rear wheel tire pressure sensor 444. The receiver 450 may receive RF signals transmitted by the left rear wheel tire pressure sensor 442 and the right rear wheel tire pressure sensor 444.

Although not illustrated in FIG. 4, the determination of which wheel of the vehicle the tire pressure sensor is mounted on may be performed by a processor of the vehicle control apparatus. The processor of the vehicle control apparatus may receive information about RF signals through the receiver 450. However, it is not limited thereto. The determination of which wheel of the vehicle the tire pressure sensor is mounted on may be performed by an internal processor included in the receiver 450.

According to an embodiment, the processor of the vehicle control apparatus may determine a tire pressure sensor, which transmits an RF signal which is identical to the RF signal received based on the LF signal of the third LF antenna 433 among the RF signals received based on the LF signal of the first LF antenna 431, as the left rear wheel tire pressure sensor 442.

The processor of the vehicle control apparatus may determine a tire pressure sensor, which transmits an RF signal which is not identical to the RF signal received based on the LF signal of the third LF antenna 433 among the RF signals received based on the LF signal of the first LF antenna 431, as the left front wheel tire pressure sensor 441.

According to an embodiment, the processor of the vehicle control apparatus may determine a tire pressure sensor, which transmits an RF signal which is identical to the RF signal received based on the LF signal of the third LF antenna 433 among the RF signals received based on the LF signal of the second LF antenna 432, as the right rear wheel tire pressure sensor 444.

The processor of the vehicle control apparatus may determine a tire pressure sensor, which transmits an RF signal which is not identical to the RF signal received based on the LF signal of the third LF antenna 433 among the RF signals received based on the LF signal of the second LF antenna 432, as the right front wheel tire pressure sensor 443.

According to an embodiment according to FIG. 4, upon sequentially driving the LF antennas by means of the receiver 450, the processor of the vehicle control apparatus may determine whether each of the tire pressure sensors is a sensor attached to any wheel of the vehicle, by means of the RF signals received from the tire pressure sensors.

Figure 5:
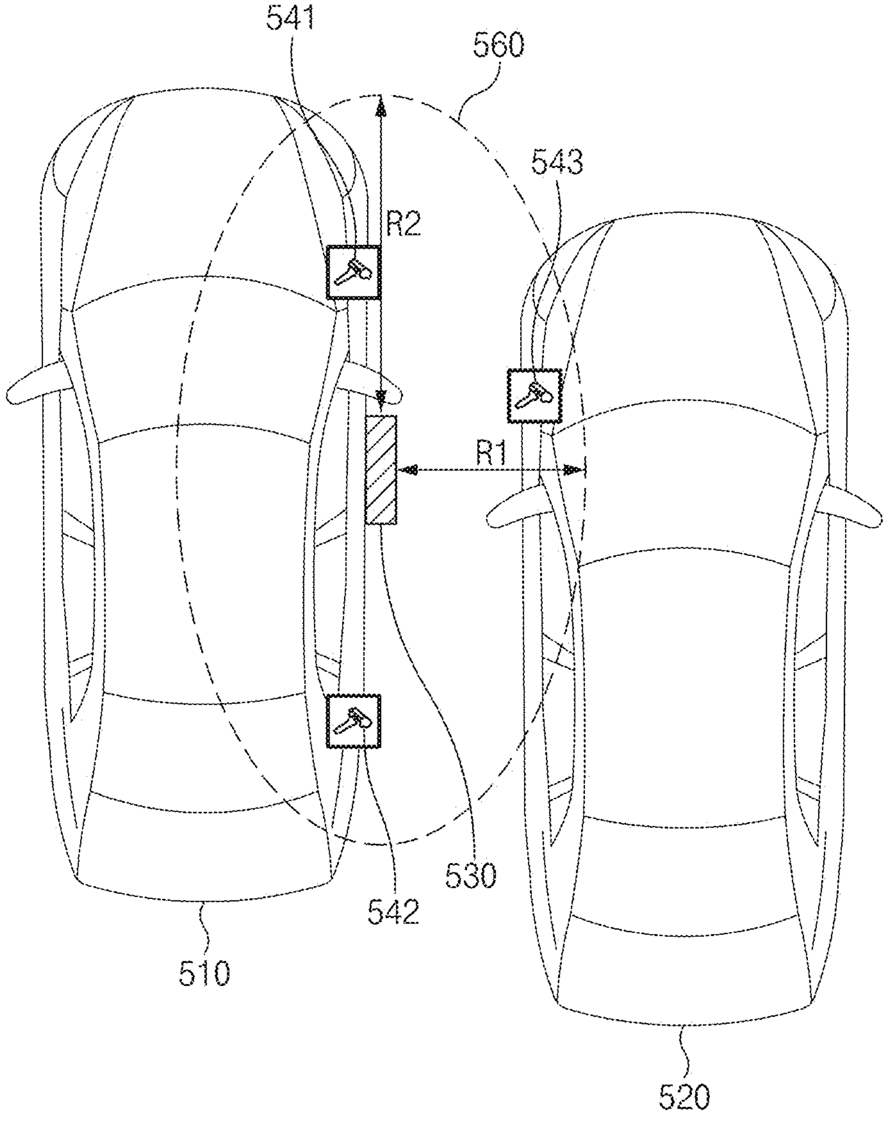
FIG. 5 is a drawing for describing a situation in which a vehicle control apparatus receives an RF signal transmitted by a tire pressure sensor of another vehicle, according to an embodiment of the present disclosure.

FIG. 5 is a drawing for describing a situation in which a vehicle control apparatus receives an RF signal transmitted by a tire pressure sensor of another vehicle, according to an embodiment of the present disclosure.

According to an embodiment, an LF antenna 530 of a host vehicle 510 may trigger a tire pressure sensor present in an area where an LF signal transmitted by the LF antenna 530 is able to be reached. Herein, the area 560 where the LF signal transmitted by the LF antenna 530 is able to be reached may be set to an oval with a short-axis radius R1 and a long-axis radius R2.

For example, when there are a right front wheel tire pressure sensor 541 and a right rear wheel tire pressure sensor 542 of the host vehicle 510 in the area 560 where the LF signal transmitted by the LF antenna 530 is able to be reached, upon receiving the LF signal, the right front wheel tire pressure sensor 541 and the right rear wheel tire pressure sensor 542 of the host vehicle 510 may transmit an RF signal.

According to an embodiment, when there is another vehicle 520 at a distance adjacent to the host vehicle 510, there may be a tire pressure sensor 543 of the other vehicle 520 in the area 560 where the LF signal transmitted by the LF antenna 530 is able to be reached. In this case, upon receiving the LF signal, the tire pressure sensor 543 of the other vehicle 520 may transmit the RF signal.

According to an embodiment, when there is the other vehicle 520 at the distance adjacent to the host vehicle 510, a processor of the vehicle control apparatus may receive three different RF signals through a receiver.

For example, the processor of the vehicle control apparatus may receive the RF signal transmitted by the right front wheel tire pressure sensor 541 of the host vehicle 510, the RF signal transmitted by the right rear wheel tire pressure sensor 542 of the host vehicle 510, and the RF signal transmitted by the tire pressure sensor 543 of the other vehicle 520. In this case, the processor of the vehicle control apparatus may determine that the RF signal transmitted by the tire pressure sensor 543 of the other vehicle 520 is included in the three different RF signals received through the receiver.

According to an embodiment, the processor of the vehicle control apparatus may drive the LF antenna 530 by means of the receiver to retransmit the LF signal, after a predetermined time from a time point when the RF signal transmitted by the tire pressure sensor 543 of the other vehicle 520 is received, based on the RF signal transmitted by the tire pressure sensor 543 of the other vehicle 520 being included in the received three different RF signals.

According to an embodiment, when two different RF signals among the three or more different RF signals are re-received in the receiver, based on the retransmitted LF signal, the processor of the vehicle control apparatus may determine that the re-received two different RF signals are received from the right front wheel tire pressure sensor 541 and the right rear wheel tire pressure sensor 542 of the host vehicle 510.

According to an embodiment according to FIG. 5, when the three or more different RF signals are received based on the LF signal transmitted by any one LF antenna, the processor of the vehicle control apparatus may determine that the RF signal of the other vehicle is included in the three different RF signals. In this case, upon retransmitting the LF signal after the predetermined time, the processor of the vehicle control apparatus may re-receive the RF signals transmitted by only the tire pressure sensors of the host vehicle 510.

Figure 6:
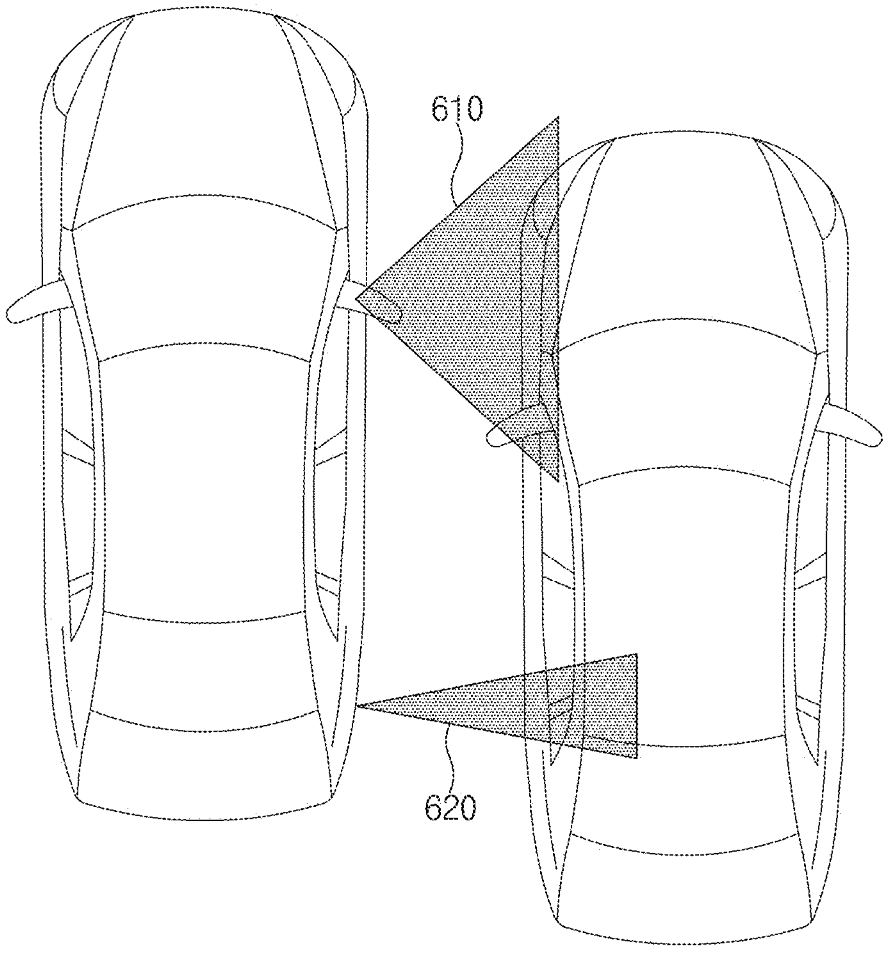
FIG. 6 is a drawing illustrating an example of identifying whether there is another vehicle adjacent to a host vehicle by means of various sensors, in a vehicle control apparatus according to an embodiment of the present disclosure.

FIG. 6 is a drawing illustrating an example of identifying whether there is another vehicle adjacent to a host vehicle by means of various sensors, in a vehicle control apparatus according to an embodiment of the present disclosure.

According to an embodiment, a processor of the vehicle control apparatus may determine whether there is another vehicle within a predetermined distance from a host vehicle, using at least one of a camera 610 mounted on the outside of the vehicle or an ultrasonic sensor 620 mounted on the outside of the vehicle, or any combination thereof.

For example, the camera 610 may include a camera sensor mounted on a side mirror. As a detailed example, the camera 610 may include a camera sensor capable of detecting or capturing the side and rear of the host vehicle.

For example, the ultrasonic sensor 620 mounted on the outside of the vehicle may include a distance sensor for sensing a distance between the host vehicle and a surrounding object.

According to an embodiment according to FIG. 6, the processor of the vehicle control apparatus may continuously identify another vehicle present around the host vehicle using the camera 610 mounted on the outside of the host vehicle, the ultrasonic sensor 620 mounted on the outside of the host vehicle, or the like.

Figure 7:
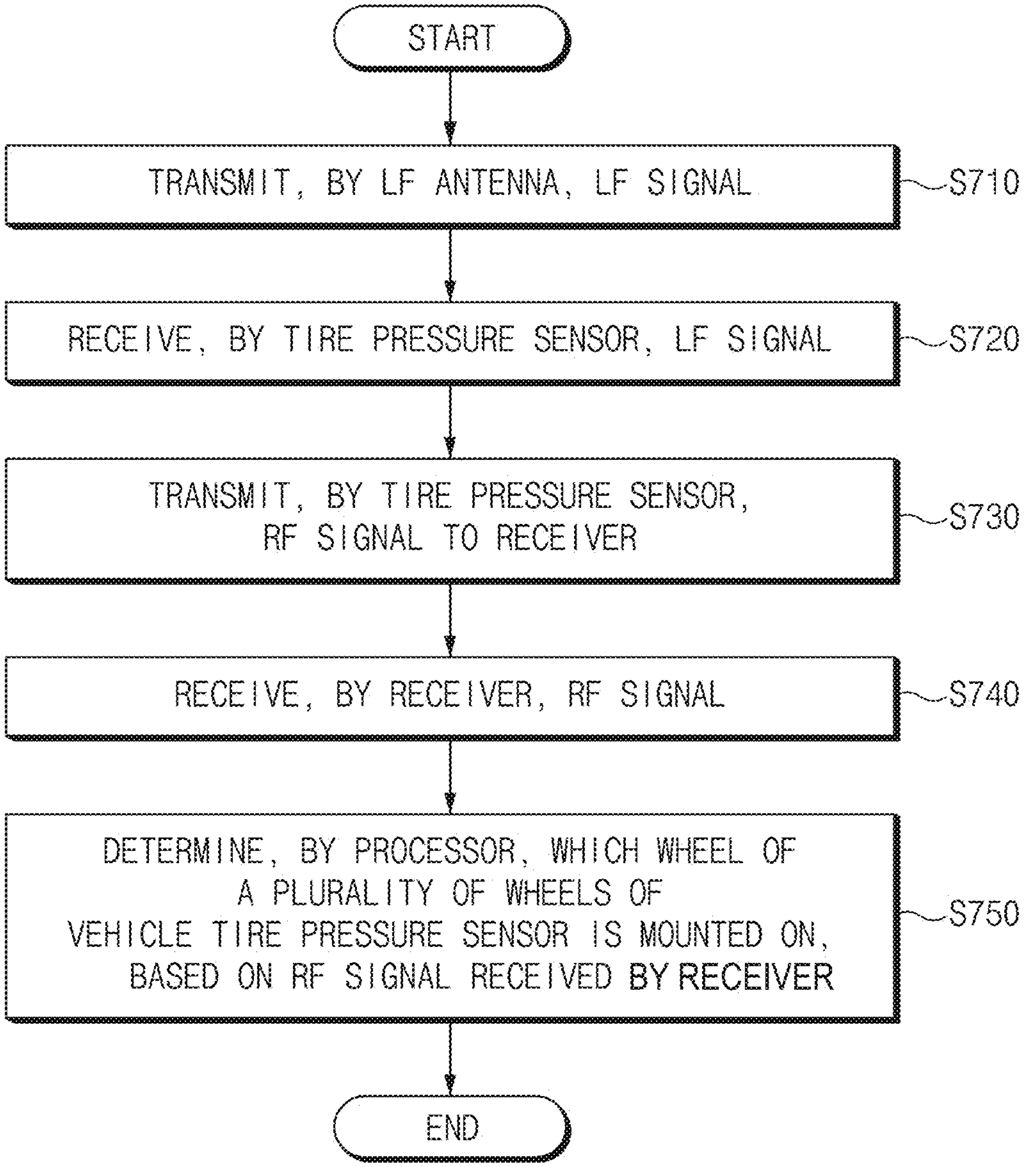
FIG. 7 is a flowchart for describing a vehicle control apparatus or a vehicle control method according to an embodiment of the present disclosure.

FIG. 7 is a flowchart for describing a vehicle control apparatus or a vehicle control method according to an embodiment of the present disclosure.

According to an embodiment, in S710, a plurality of LF antennas, which transmits an LF signal for triggering each of a plurality of tire pressure sensors, may transmit the LF signal.

According to an embodiment, in S720, at least some of the plurality of tire pressure sensors present in an area where a transmit signal of each of the plurality of LF antennas is reached may receive the LF signal transmitted by the LF antenna.

According to an embodiment, upon receiving the LF signal, in S730, at least some of the plurality of tire pressure sensors mounted on a plurality of wheels of a vehicle may transmit an RF signal to a receiver.

According to an embodiment, in S740, the receiver, which drives the plurality of LF antennas and receives the RF signal, may receive the RF signal transmitted by the at least some of the plurality of tire pressure sensors.

According to an embodiment, in S750, a processor of the vehicle control apparatus may determine which wheel of the plurality of wheels of the vehicle each of the plurality of tire pressure sensors is mounted on, based on the RF signal received from the at least some of the plurality of tire pressure sensors present in the area where the transmit signal of the LF antenna is reached.

Figure 8:
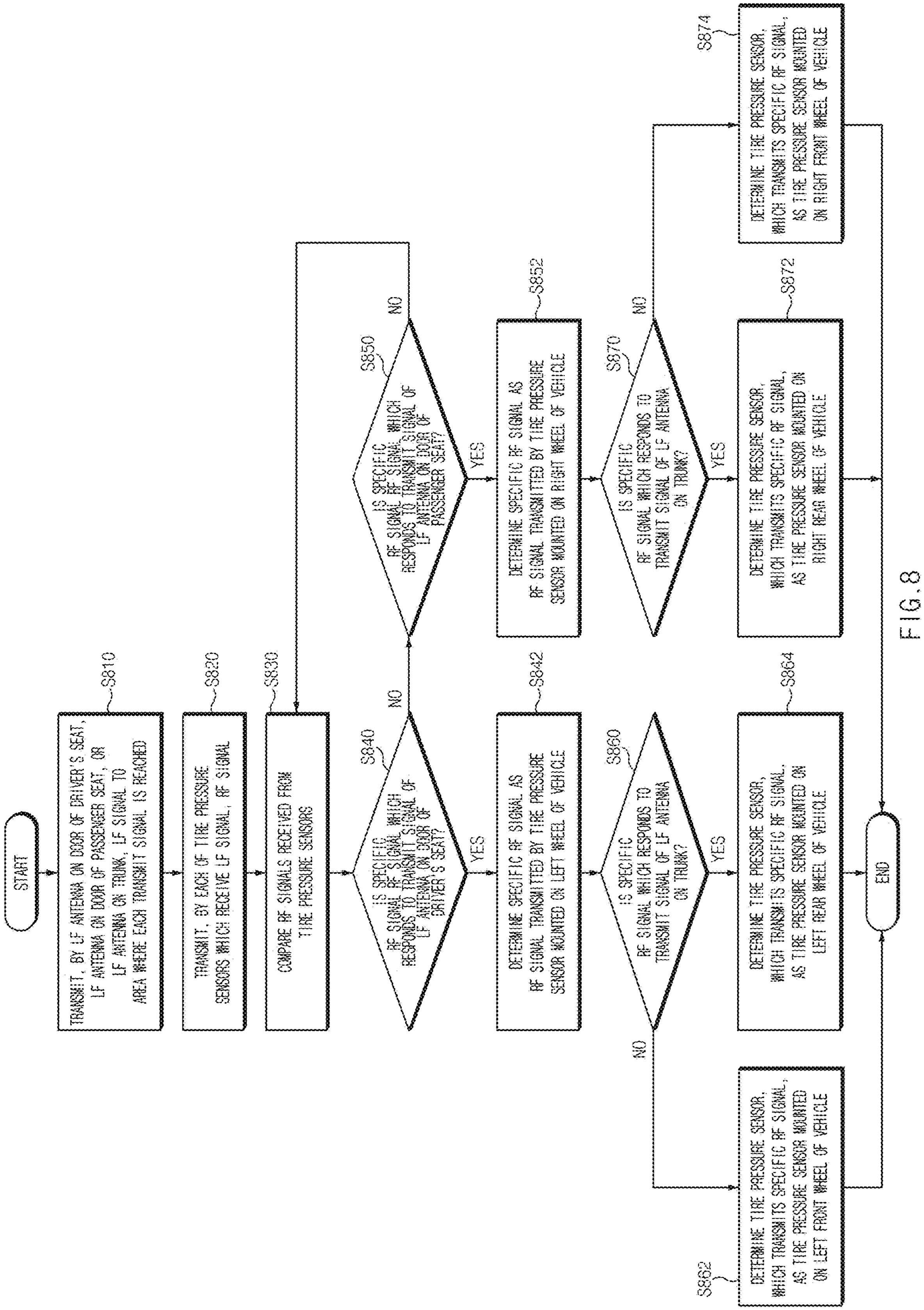
FIG. 8 is a flowchart for describing in detail an example of a method for determining which wheel a tire pressure sensor is mounted on, in a vehicle control apparatus or a vehicle control method according to an embodiment of the present disclosure.

FIG. 8 is a flowchart for describing in detail an example of a method for determining which wheel a tire pressure sensor is mounted on, in a vehicle control apparatus or a vehicle control method according to an embodiment of the present disclosure.

According to an embodiment, in S810, an LF antenna located on a door of the driver's seat, an LF antenna located on a door of the passenger seat, or an LF antenna located on a trunk may transmit an LF signal to an area where each transmit signal is reached. The LF antennas may trigger a tire pressure sensor which receives the LF signal. The tire pressure sensors may be triggered whenever receiving the LF signal.

According to an embodiment, in S820, each of the tire pressure sensors which receive the LF signal may transmit an RF signal. For example, when receiving a plurality of LF signals, the tire pressure sensor may transmit the RF signal several times. As a detailed example, when the left rear wheel tire pressure sensor of the vehicle is included in both of the area where the transmit signal of the LF antenna located on the door of the driver's seat is reached and the area where the transmit signal of the LF antenna located on the trunk is reached, it may transmit the RF signal two times.

According to an embodiment, in S830, a processor of the vehicle control apparatus may compare the RF signals received from the tire pressure sensors.

According to an embodiment, in S840, the processor of the vehicle control apparatus may determine whether a specific RF signal is an RF signal which responds to the transmit signal of the LF antenna located on the door of the driver's seat. For example, when it is determined that the specific RF signal is the RF signal which responds to the transmit signal of the LF antenna located on the door of the driver's seat, in S842, the processor may determine the specific RF signal as the RF signal transmitted by the tire pressure sensor mounted on the left wheel of the vehicle.

According to an embodiment, in S860, the processor may determine whether the specific RF signal is the RF signal which responds to the transmit signal of the LF antenna located on the trunk, based on determining the specific RF signal as the RF signal transmitted by the tire pressure sensor mounted on the left wheel of the vehicle.

For example, when it is determined that the specific RF signal is the RF signal which responds to the transmit signal of the LF antenna located on the trunk, in S864, the processor may determine the tire pressure sensor, which transmits the specific RF signal, as the tire pressure sensor mounted on the left rear wheel of the vehicle.

On the other hand, when it is determined that the specific RF signal is not the RF signal which responds to the transmit signal of the LF antenna located on the trunk, in S862, the processor may determine the tire pressure sensor, which transmits the specific RF signal, as the tire pressure sensor mounted on the left front wheel of the vehicle.

According to another embodiment, when it is determined that the specific RF signal is not the RF signal which responds to the transmit signal of the LF antenna located on the door of the driver's seat, in S850, the processor may determine whether the specific RF signal is the RF signal which responds to the transmit signal of the LF antenna located on the door of the passenger seat. For example, when it is determined that the specific RF signal is not the RF signal which responds to the transmit signal of the LF antenna located on the door of the passenger seat, in S830, the processor may compare the RF signals received from the tire pressure sensors again.

According to an embodiment, when it is determined that the specific RF signal is the RF signal which responds to the transmit signal of the LF antenna located on the door of the passenger seat, in S852, the processor may determine the specific RF signal as the RF signal transmitted by the tire pressure sensor mounted on the right wheel of the vehicle.

According to an embodiment, in S870, the processor may determine whether the specific RF signal is the RF signal which responds to the transmit signal of the LF antenna located on the trunk, based on determining the specific RF signal as the RF signal transmitted by the tire pressure sensor mounted on the right wheel of the vehicle.

For example, when it is determined that the specific RF signal is the RF signal which responds to the transmit signal of the LF antenna located on the trunk, in S872, the processor may determine the tire pressure sensor, which transmits the specific RF signal, as the tire pressure sensor mounted on the right rear wheel of the vehicle.

On the other hand, when it is determined that the specific RF signal is not the RF signal which responds to the transmit signal of the LF antenna located on the trunk, in S874, the processor may determine the tire pressure sensor, which transmits the specific RF signal, as the tire pressure sensor mounted on the right front wheel of the vehicle.

Figure 9:
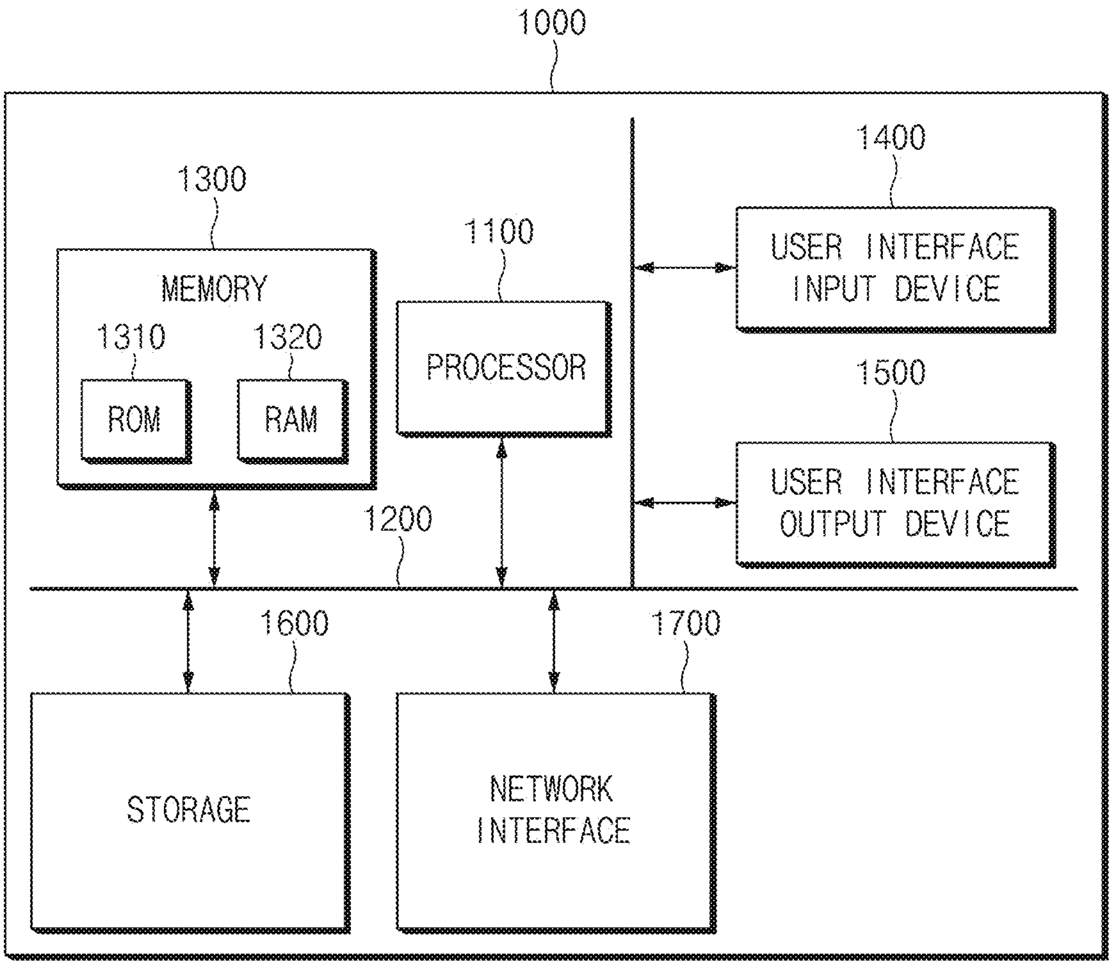
FIG. 9 illustrates a computing system associated with a vehicle control apparatus or a vehicle control method according to an embodiment of the present disclosure.

FIG. 9 illustrates a computing system associated with a vehicle control apparatus or a vehicle control method according to an embodiment of the present disclosure.

Referring to FIG. 9, a computing system 1000 may include at least one processor 1100, a memory 1300, a user interface input device 1400, a user interface output device 1500, a storage (i.e., a memory) 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Accordingly, the operations of the method or algorithm described in connection with the embodiments disclosed in the specification may be directly implemented with a hardware module, a software module, or a combination of the hardware module and the software module, which is executed by the processor 1100. The software module may reside on a storage medium (that is, the memory 1300 and/or the storage 1600) such as a RAM, a flash memory, a ROM, an EPROM, an EEPROM, a register, a hard disk, a removable disk, and a CD-ROM.

The exemplary storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The present technology may reduce costs by using an LF antenna mounted on the vehicle, without a separate additional sensor.

Furthermore, the present technology may improve stability by using the LF antenna which is not influenced by an error in wheel pulse, an error in CAN communication, or the like.

Furthermore, the present technology may receive information about tire pressure even immediately after the vehicle is started by using the LF antenna capable of transmitting a signal even while the vehicle is not traveling.

In addition, various effects ascertained directly or indirectly through embodiments of the present disclosure may be provided.

Hereinabove, although embodiments of the present disclosure have been described with reference to exemplary embodiments and the accompanying drawings, the present disclosure is not limited thereto, but it may be variously modified and altered by those skilled in the art to which the present disclosure pertains without departing from the spirit and scope of the present disclosure claimed in the following claims.

Therefore, embodiments of the present disclosure are not intended to limit the technical spirit of the present disclosure but are provided only for illustrative purposes. The scope of the present disclosure should be construed on the basis of the accompanying claims, and all the technical ideas within the scope equivalent to the claims should be included in the scope of the present disclosure.

What is claimed is:

1. A vehicle control apparatus comprising:

a plurality of tire pressure sensors respectively mounted on a plurality of wheels of a vehicle;

a plurality of antennas, each antenna configured to transmit a low frequency (LF) signal for triggering ones of the plurality of tire pressure sensors present in an area where the LF signal of the respective antenna reaches;

a receiver configured to drive the plurality of antennas and receive radio frequency (RF) signals transmitted from the tire pressure sensors in response to receiving the LF signals, wherein each of the RF signals comprises a unique ID of a corresponding tire pressure sensor;

one or more processors; and a storage device storing a program to be executed by the one or more processors, the program including instructions to:

determine, for each tire pressure sensor, which wheel that tire pressure sensor is mounted on based on the RF signals received from the tire pressure sensors present in the area where the LF signal of the respective antenna reaches, wherein, in response to the receiver receiving three or more different RF signals having different unique IDs based on the LF signal transmitted by a selected antenna of the plurality of antennas, the program further includes instructions to:

determine that the three or more different RF signals include an additional RF signal transmitted by a tire pressure sensor of another vehicle;

drive each antenna of the plurality of antennas to re-transmit the LF signals after a predetermined time from a time at which the additional RF signal is received, the predetermined time being set, based on a speed of the vehicle and a speed of the other vehicle, to a time after which the other vehicle is estimated to be outside a distance from the vehicle at which the tire pressure sensor of the other vehicle is able to receive the LF signals transmitted by at least one antenna of the plurality of antennas;

determine that the receiver re-received two RF signals among the three or more different RF signals in response to the LF signals being re-transmitted; and determine that the re-received two RF signals correspond to the tire pressure sensors of the vehicle based on the unique ID of each of the re-received two RF signals being identical to two of the different unique IDs of the received three or more different RF signals.

2. The vehicle control apparatus of claim 1, wherein:

the plurality of antennas comprises a first LF antenna, a second LF antenna, and a third LF antenna;

the first LF antenna is configured to transmit a first LF signal to the tire pressure sensors present in a first area where the first LF signal reaches;

the second LF antenna is configured to transmit a second LF signal to the tire pressure sensors present in a second area where the second LF signal reaches; and the third LF antenna is configured to transmit a third LF signal to the tire pressure sensors present in a third area where the third LF signal reaches.

3. The vehicle control apparatus of claim 2, wherein the plurality of tire pressure sensors comprises a tire pressure sensor of a left front wheel tire, a tire pressure sensor of a left rear wheel tire, a tire pressure sensor of a right front wheel tire, and a tire pressure sensor of a right rear wheel tire, wherein the program further includes instructions to:

set the first area such that only the tire pressure sensor of the left front wheel tire of the vehicle and the tire pressure sensor of the left rear wheel tire of the vehicle receive the first LF signal;

set the second area such that only the tire pressure sensor of the right front wheel tire of the vehicle and the tire pressure sensor of the right rear wheel tire of the vehicle receive the second LF signal; and set the third area such that only the tire pressure sensor of the left rear wheel tire of the vehicle and the tire pressure sensor of the right rear wheel tire of the vehicle receive the third LF signal.

4. The vehicle control apparatus of claim 3, wherein the program further includes instructions to set an extent of the first area, the second area, the third area, or any combination of the first area, the second area, and the third area based on vehicle information including an overall length of the vehicle, an overall width of the vehicle, or an overall height of the vehicle.

5. The vehicle control apparatus of claim 2, wherein the program further includes instructions to:

determine the tire pressure sensors that transmit the RF signals based on the first LF signal as the tire pressure sensor mounted on a left front wheel of the vehicle, the tire pressure sensor mounted on a left rear wheel of the vehicle, or both the tire pressure sensor mounted on the left front wheel of the vehicle and the tire pressure sensor mounted on the left rear wheel of the vehicle;

determine the tire pressure sensors that transmit the RF signals based on the second LF signal as the tire pressure sensor mounted on a right front wheel of the vehicle, the tire pressure sensor mounted on a right rear wheel of the vehicle, or both the tire pressure sensor mounted on the right front wheel of the vehicle and the tire pressure sensor mounted on the right rear wheel of the vehicle; and determine the tire pressure sensors that transmit the RF signals based on the third LF signal as the tire pressure sensor mounted on the left rear wheel of the vehicle, the tire pressure sensor mounted on the right rear wheel of the vehicle, or both the tire pressure sensor mounted on the left rear wheel of the vehicle and the tire pressure sensor mounted on the right rear wheel of the vehicle.

6. The vehicle control apparatus of claim 2, wherein the program further includes instructions to:

determine the tire pressure sensor that transmits the RF signals based on only the first LF signal as the tire pressure sensor mounted on a left front wheel of the vehicle;

determine the tire pressure sensor that transmits the RF signals based on only the first LF signal and the third LF signal as the tire pressure sensor mounted on a left rear wheel of the vehicle;

determine the tire pressure sensor that transmits the RF signals based on only the second LF signal as the tire pressure sensor mounted on a right front wheel of the vehicle; and determine the tire pressure sensor that transmits the RF signals based on only the second LF signal and the third LF signal as the tire pressure sensor mounted on a right rear wheel of the vehicle.

7. The vehicle control apparatus of claim 1, wherein:

each of the plurality of tire pressure sensors is configured to transmit the RF signals to the receiver;

each of the RF signals further comprises a pressure value of a tire; and the pressure value is a value measured by the corresponding tire pressure sensor.

8. The vehicle control apparatus of claim 1, wherein the area where the LF signal of the respective antenna reaches has an oval shape with a long axis and a short axis.

9. The vehicle control apparatus of claim 1, wherein the program further includes instructions to determine whether there is another vehicle within a predetermined distance from the vehicle using a camera mounted on an outside of the vehicle, an ultrasonic sensor mounted on the outside of the vehicle, or both the camera and the ultrasonic sensor.

10. A method comprising:

transmitting, by a plurality of antennas that each transmit a low frequency (LF) signal for triggering a plurality of tire pressure sensors mounted on a plurality of wheels of a vehicle, LF signals to the tire pressure sensors that are present in an area where the LF signal of the respective antenna reaches;

transmitting, by the plurality of tire pressure sensors, radio frequency (RF) signals to a receiver in response to receiving the LF signals, wherein each of the RF signals comprises a unique ID of a corresponding tire pressure sensor;

receiving, by the receiver, the RF signals; and determining which wheel of the plurality of wheels each of the plurality of tire pressure sensors is mounted on based on the RF signals received from the tire pressure sensors present in the area where the LF signal of the respective antenna reaches, wherein, in response to receiving, by the receiver, three or more different RF signals having different unique IDs based on the LF signal transmitted by a selected antenna of the plurality of antennas, determining which wheel of the plurality of wheels each of the plurality of tire pressure sensors is mounted on comprises:

determining that the three or more different RF signals include an additional RF signal transmitted by a tire pressure sensor of another vehicle;

re-transmitting, by each antenna of the plurality of antennas, the LF signals after a predetermined time from a time at which the additional RF signal is received, the predetermined time being set, based on a speed of the vehicle and a speed of the other vehicle, to a time after which the other vehicle is estimated to be outside a predetermined distance from the vehicle, wherein the predetermined distance is set to a distance at which the tire pressure sensor of the other vehicle is able to receive the LF signals transmitted by at least one antenna of the plurality of antennas;

re-receiving, by the receiver, two RF signals among the three or more different RF signals in response to re-transmitting the LF signals after the predetermined time; and determining that the re-received two RF signals correspond to the tire pressure sensors of the vehicle based on the unique ID of each of the re-received two RF signals being identical to two of the different unique IDs of the received three or more different RF signals.

11. The method of claim 10, wherein transmitting the LF signals comprises:

transmitting, by a first LF antenna included in the plurality of antennas, a first LF signal to the tire pressure sensors present in a first area where the first LF signal of the first LF antenna reaches;

transmitting, by a second LF antenna included in the plurality of antennas, a second LF signal to the tire pressure sensors present in a second area where the second LF signal of the second LF antenna reaches; and transmitting, by a third LF antenna included in the plurality of antennas, a third LF signal to the tire pressure sensors present in a third area where the third LF signal of the third LF antenna reaches.

12. The method of claim 11, wherein determining which wheel of the plurality of wheels each of the plurality of tire pressure sensors is mounted on comprises:

determining the tire pressure sensors that transmit the RF signals based on the first LF signal of the first LF antenna as the tire pressure sensor mounted on a left front wheel of the vehicle, the tire pressure sensor mounted on a left rear wheel of the vehicle, or both the tire pressure sensor mounted on the left front wheel of the vehicle and the tire pressure sensor mounted on the left rear wheel of the vehicle;

determining the tire pressure sensors that transmit the RF signals based on the second LF signal of the second LF antenna as the tire pressure sensor mounted on a right front wheel of the vehicle, the tire pressure sensor mounted on a right rear wheel of the vehicle, or both the tire pressure sensor mounted on the right front wheel of the vehicle and the tire pressure sensor mounted on the right rear wheel of the vehicle; and determining the tire pressure sensors that transmit the RF signals based on the third LF signal of the third LF antenna as the tire pressure sensor mounted on the left rear wheel of the vehicle, the tire pressure sensor mounted on the right rear wheel of the vehicle, or both the tire pressure sensor mounted on the left rear wheel of the vehicle and the tire pressure sensor mounted on the right rear wheel of the vehicle.

13. The method of claim 10, wherein transmitting the RF signals to the receiver comprises transmitting, by each of the plurality of tire pressure sensors, the RF signals, wherein each of the RF signals further comprises a pressure value of a tire, and wherein the pressure value is a value measured by the corresponding tire pressure sensor.

14. The method of claim 10, wherein determining which wheel of the plurality of wheels each of the plurality of tire pressure sensors is mounted on comprises determining whether there is another vehicle within a predetermined distance from the vehicle using a camera mounted on an outside of the vehicle, an ultrasonic sensor mounted on the outside of the vehicle, or both the camera and the ultrasonic sensor.

15. A method comprising:

transmitting, by a plurality of antennas that each transmit a low frequency (LF) signal for triggering a plurality of tire pressure sensors mounted on a plurality of wheels of a first vehicle, LF signals to the tire pressure sensors that are present in an area where the LF signal of the respective antenna reaches;

transmitting, by the plurality of tire pressure sensors, radio frequency (RF) signals to a receiver in response to receiving the LF signals, wherein each of the RF signals comprises a unique ID of a corresponding tire pressure sensor;

receiving, by the receiver, a first set of RF signals comprising three or more different RF signals having different unique IDs based on the LF signal transmitted by a selected antenna of the plurality of antennas;

determining that the first set of RF signals includes an additional RF signal transmitted by a tire pressure sensor of a second vehicle;

re-transmitting, by the plurality of antennas, the LF signals after a predetermined time, the predetermined time being set, based on a speed of the first vehicle and a speed of the second vehicle, to a time after which the second vehicle is estimated to be outside a predetermined distance from the first vehicle such that the tire pressure sensor of the second vehicle is unable to receive the LF signals re-transmitted by at least one antenna of the plurality of antennas;

re-receiving, by the receiver, a second set of RF signals comprising two RF signals in response to re-transmitting the LF signals;

determining that the second set of RF signals corresponds to the tire pressure sensors of the first vehicle based on the unique ID of each of the two RF signals being identical to two of the different unique IDs of the first set of RF signals; and determining which wheel of the plurality of wheels each of the plurality of tire pressure sensors is mounted on based on the second set of RF signals.

16. The method of claim 15, wherein transmitting the LF signals comprises:

transmitting, by a first LF antenna included in the plurality of antennas, a first LF signal to the tire pressure sensors present in a first area where the first LF signal of the first LF antenna reaches;

transmitting, by a second LF antenna included in the plurality of antennas, a second LF signal to the tire pressure sensors present in a second area where the second LF signal of the second LF antenna reaches; and transmitting, by a third LF antenna included in the plurality of antennas, a third LF signal to the tire pressure sensors present in a third area where the third LF signal of the third LF antenna reaches.

17. The method of claim 16, wherein determining which wheel of the plurality of wheels each of the plurality of tire pressure sensors is mounted on comprises:

determining that the second set of RF signals corresponds to the tire pressure sensor mounted on a left front wheel of the first vehicle, the tire pressure sensor mounted on a left rear wheel of the first vehicle, or both the tire pressure sensor mounted on the left front wheel of the first vehicle and the tire pressure sensor mounted on the left rear wheel of the first vehicle based on the first LF signal of the first LF antenna;

determining that the second set of RF signals corresponds to the tire pressure sensor mounted on a right front wheel of the first vehicle, the tire pressure sensor mounted on a right rear wheel of the first vehicle, or both the tire pressure sensor mounted on the right front wheel of the first vehicle and the tire pressure sensor mounted on the right rear wheel of the first vehicle based on the second LF signal of the second LF antenna; and determining that the second set of RF signals corresponds to the tire pressure sensor mounted on the left rear wheel of the first vehicle, the tire pressure sensor mounted on the right rear wheel of the first vehicle, or both the tire pressure sensor mounted on the left rear wheel of the first vehicle and the tire pressure sensor mounted on the right rear wheel of the first vehicle based on the third LF signal of the third LF antenna.

18. The method of claim 15, wherein transmitting the RF signals to the receiver comprises transmitting the RF signals by each of the plurality of tire pressure sensors, wherein each of the RF signals further comprises a pressure value of a tire, and wherein the pressure value is a value measured by the corresponding tire pressure sensor.

19. The method of claim 15, further comprising determining that the second vehicle is outside the predetermined distance from the first vehicle using a camera mounted on an outside of the first vehicle, an ultrasonic sensor mounted on the outside of the first vehicle, or both the camera and the ultrasonic sensor.

* * * * *